(12) United States Patent
Burckhardt

(10) Patent No.: US 9,176,793 B2
(45) Date of Patent: Nov. 3, 2015

(54) MANAGED CHANNEL FOR ASYNCHRONOUS REQUESTS

(75) Inventor: Vincent Burckhardt, Clonee (IE)

(73) Assignee: International Business Machines Corporation, Armonk, NY (US)

( * ) Notice: Subject to any disclaimer, the term of this patent is extended or adjusted under 35 U.S.C. 154(b) by 375 days.

(21) Appl. No.: 13/516,439

(22) PCT Filed: Nov. 23, 2010

(86) PCT No.: PCT/EP2010/068047
§ 371 (c)(1),
(2), (4) Date: Aug. 20, 2012

(87) PCT Pub. No.: WO2011/072993
PCT Pub. Date: Jun. 23, 2011

(65) Prior Publication Data
US 2012/0311024 A1 Dec. 6, 2012

(30) Foreign Application Priority Data
Dec. 17, 2009 (EP) .................................... 09179596

(51) Int. Cl.
*G06F 9/54* (2006.01)
*H04L 29/08* (2006.01)

(52) U.S. Cl.
CPC ................ *G06F 9/542* (2013.01); *G06F 9/541* (2013.01); *G06F 9/547* (2013.01); *G06F 2209/542* (2013.01); *G06F 2209/544* (2013.01); *H04L 67/02* (2013.01); *H04L 67/14* (2013.01);

(Continued)

(58) Field of Classification Search
CPC ......... H04L 67/14; H04L 67/26; H04L 67/32; H04L 67/42; H04L 67/141; H04L 67/148; G06F 9/541; G06F 9/547; G06F 9/542

USPC ................... 709/203, 217, 219, 224; 707/613
See application file for complete search history.

(56) References Cited

U.S. PATENT DOCUMENTS 6,164,841 A * 12/2000 Mattson et al. ................ 716/103
6,742,124 B1 * 5/2004 Kilpatrick et al. .............. 726/23

(Continued)

OTHER PUBLICATIONS

Ali Mesbah, Arie van Deursen, The Journal of System and Software: A component and push-based architectural style fro AJAX applications, Apr. 1, 2008, Elsevier, Edition 81, pp. 2194-2209.*
International Search Report for International Patent Application No. PCT/EP2010/068047, Dated Apr. 21, 2011, pp. 1-3.
Mesbah et al., "A Component—and Push-Based Architectural Style for Ajax Applications," Journal of Systems and Software, vol. 81, No. 12, Dec. 1, 2008, pp. 1-42.

(Continued)

*Primary Examiner* — Oleg Survillo
(74) *Attorney, Agent, or Firm* — Holland & Knight LLP; Brian J. Colandreo, Esq.; Jeffrey T. Placker, Esq.

(57) ABSTRACT

Apparatus and method for use with a data processing system, wherein the data processing system comprises a client and a server, comprising: a receive component for receiving a call from a client application to a first method of an object, and for receiving a reply on the channel; an interceptor component, for wrapping the object to provide a wrapped call to a second method of the wrapped object, and for invoking a response handler; a client encoder component for converting the wrapped call into a message; a client channel manager component for establishing a channel to the server; a sender component, for sending the message on the channel; a reply decoder component for decoding the reply to provide a response; and the sender component further for sending the response to the client application.

16 Claims, 4 Drawing Sheets

(52) U.S. Cl.
CPC .............. *H04L67/141* (2013.01); *H04L 67/26* (2013.01); *H04L 67/32* (2013.01)

(56) References Cited

U.S. PATENT DOCUMENTS

| | | | | |
|---|---|---|---|---|
| 7,487,201 | B1* | 2/2009 | Murray et al. | 709/201 |
| 7,725,574 | B2* | 5/2010 | O'Connell et al. | 709/224 |
| 7,788,341 | B1* | 8/2010 | Burns | 709/219 |
| 7,912,927 | B2* | 3/2011 | Thangadurai et al. | 709/220 |
| 8,150,939 | B1* | 4/2012 | Murray | 709/217 |
| 2004/0003093 | A1* | 1/2004 | Kamath | 709/227 |
| 2006/0047780 | A1* | 3/2006 | Patnude | 709/219 |
| 2006/0206705 | A1* | 9/2006 | Khosravi | 713/151 |
| 2007/0168979 | A1* | 7/2007 | Kumar et al. | 717/124 |
| 2007/0256055 | A1* | 11/2007 | Herscu | 717/115 |
| 2007/0300150 | A1* | 12/2007 | Davis | 715/513 |
| 2009/0037518 | A1* | 2/2009 | McAllister et al. | 709/203 |
| 2009/0063618 | A1 | 3/2009 | Chetuparambil et al. | |
| 2009/0132998 | A1* | 5/2009 | Meijer et al. | 717/124 |
| 2009/0144707 | A1 | 6/2009 | Goff et al. | |
| 2009/0157859 | A1* | 6/2009 | Morris | 709/223 |
| 2009/0210781 | A1* | 8/2009 | Hagerott et al. | 715/234 |
| 2010/0031233 | A1* | 2/2010 | Li et al. | 717/106 |
| 2010/0302261 | A1* | 12/2010 | Abdo et al. | 345/506 |
| 2010/0312858 | A1* | 12/2010 | Mickens et al. | 709/219 |
| 2011/0083126 | A1* | 4/2011 | Bhakta et al. | 717/168 |

OTHER PUBLICATIONS

Albornoz-Mulligan, "Implementing a Bayeux to JMS Bridge," http://cometdaily.com/2008/07/09/implementing-a-bayeaux-to-jms-bridge/ retrieved Feb. 28, 2011, pp. 1-4.

Wilkins, "The Many Shades of Bayeux/Cometd", http://cometdaily.com/2008/05/15/the-many-shades-of-bayeauxcometd-2/ retrieved on Feb. 28, 2011, pp. 1-4.

Bozdag, Integration of HTTP Push with a JSF AJAX Framework, http://swerl.tudelft.nl/twiki/pub/main/pastandcurrentmscprojects/thesis-engin.pdf, Dec. 2007, retrieved Feb. 25, 2011, pp. 1-106.

"The Two HTTP Connection Limit Issue," http://www.openajax.org/runtime/wiki/The_Two_HTTP_Connection_Limit_Issue, downloaded Jun. 15, 2012, pp. 1-10.

Heuser et al., "RPC Client: A Pattern for the Client-Side Implementation of A Pipelined Request/Response Protocol," Proceedings of the pattern Languages of Programs 1999 (PLoP 99), Department of Computer Science and Eng., Florida Atlantic University 1999, URL: https:hillside.net/plop/plop99/proceedings/fernandezA/heuserOO3.pdf; pp. 1-19.

Nielsen, Henrik Frystyk et al., "Network Performance Effects of HTTP/1.1, CSS1, and PNG," In: ACM SIGCOMM Computer Communication Review, ACM, 1997, S. 155-166.

OSI Model—Wikipedia, Dec. 16, 2009, URL: http://en.wikipedia.org/wiki/OSI_Model, downloaded Jun. 1, 2015; pp. 1-10.

* cited by examiner

MANAGED CHANNEL FOR ASYNCHRONOUS REQUESTS

RELATED APPLICATIONS

The subject application is a U.S. National Stage Application of International Application No. PCT/EP2010/068407, filed on 23 Nov. 2010, which claims the priority of European Patent Application No.: 09179596.3, filed on 17 Dec. 2009, the contents of which are herein incorporated by reference in its entirety.

TECHNICAL HELD

The invention relates to web applications. In particular, the invention relates to an apparatus, method and computer program for managing asynchronous requests from a web application.

BACKGROUND OF THE INVENTION

Web applications performed by web clients typically use asynchronous requests to access resources from web servers. Asynchronous requests are used so that web applications can access resources in the background without interfering with the existing webpage.

The number of concurrent asynchronous requests that can be performed by a web application may be limited by web browsers. The limit may be set to two concurrent requests in the Hypertext Transfer Protocol (HTTP) version 1.1 specification. An example of a technology used to implement asynchronous requests is Ajax (asynchronous JavaScript+Extensible Markup Language). Ajax requests from a client can retrieve data asynchronously in the background from a server, without affecting an existing webpage.

The limit may result in important performance impacts and bottlenecks in the context of web applications made of "widgets" (a widget is any piece of dynamic content that can be placed into a web page). Widgets can use the native interface provided by the browsers for example, an XMLHttpRequest object in JavaScript) to fetch content over asynchronous requests. The web application embedding a widget has no direct control on the logic executed by the widget and, in particular, whether an asynchronous request has been triggered by the widget.

Other examples of performance impacts resulting from a limit may include: a long response time for a request that is queued by a browser; and, an overflow of the number of requests when a webpage is loaded. The limit also results in an inability to set a level of priority to the requests. Further, optimizations may not be possible, because two or more requests to the same resource sent by different widgets (or different instances of the same widget) at (roughly) the same time may be handled in the same way as independent requests when it would be possible to fetch the resource only once.

Another example of a performance impact resulting from the limit may be the difficulty for the web application to have control over the web browser queue. The web browser request queue is ordered, which means that a long response time for a request currently processed by the web browser can cause the subsequent requests to be queued by the web browser until the response for the currently processed request is received, even if the subsequent requests could potentially return much faster than the currently processed request.

SUMMARY OF INVENTION

Viewed from a first aspect, an embodiment of the present invention provides a client apparatus operable for use with a data processing system, wherein the data processing system comprises a client and a server, the apparatus comprising: a receive component for receiving a call from a client application to a first method of an object, wherein the first method comprises a first request to the server, and wherein the first request comprises a first plurality of attributes; an interceptor component, responsive to the receive component receiving the call, for wrapping the object to provide a wrapped call to a second method of the wrapped object, wherein the second method comprises a second request to the server; a client encoder component, responsive to the interceptor component wrapping the object, for converting the wrapped call into a message, wherein the message comprises the first plurality of attributes; a client channel manager component, responsive to the client encoder component converting the request, operable for establishing a channel to the server; and a sender component, responsive to the client channel manager establishing the channel, for sending the message on the channel.

In an embodiment, the client apparatus further comprises: the receive component, further operable for receiving a reply on the channel, wherein the reply comprises a second plurality of attributes; a reply decoder component, responsive, to the receive component receiving the reply, for decoding the reply to provide a response, wherein the response comprises the second plurality of attributes; the interceptor component, responsive to the reply decoder component decoding the reply, further operable for invoking a response handler; and the sender component, responsive to the response handler being invoked, further operable for sending the response to the client application.

In an embodiment, the client apparatus is operable in the client application. In an embodiment, the client apparatus is operable in a web browser.

Viewed from a second aspect, an embodiment of the present invention provides a server apparatus operable for use with a data processing system, wherein the data processing system comprises a client and a server, the apparatus comprising: a server channel manager component for receiving a message on a channel from a client, the message comprising a first plurality of attributes; a server decoder component, responsive to the server channel manager component receiving the message, for decoding the message to provide a request, wherein the request comprises the first plurality of attributes; and a response fetcher component, responsive to the server decoder component providing the request for fetching a response, for sending the request to a resource.

In an embodiment, the server apparatus further comprises: the response fetcher component, further operable for receiving a response from the resource, wherein the response comprises a second plurality of attributes; a response encoder component, responsive to the response fetcher component receiving the response, for encoding the response to provide a reply, wherein the reply comprises the second plurality of attributes; and the server channel manager component, responsive to the response encoder component providing a reply, further operable for sending the reply on the channel.

Viewed from a third aspect, an embodiment of the present invention provides a client method operable for use with a data processing system, wherein the data processing system comprises a client and a server, the method comprising the steps of: receiving a call from a client application to a first method of a first object, wherein the first method comprises a first request to the server, and wherein the first request comprises a first plurality of attributes; in response to receiving the call, wrapping the object, to provide a wrapped call to a second method of the wrapped object, wherein the second method comprises a second request to the server; in response to wrapping the object, converting: the wrapped call into a message, wherein the message comprises the first plurality of attributes; in response to converting the request, establishing a channel to the server; and in response to establishing the channel, sending the message on the channel.

In an embodiment, the client method further comprises the steps of: receiving a reply on the channel, wherein the reply comprises a second plurality of attributes; in response to receiving the reply, decoding the reply to provide a response, wherein the response comprises the second plurality of attributes; in response to decoding the reply, invoking a response handler; and in response to the response handler being invoked, sending the response to the client application.

In an embodiment, the client method is operable in the client application. In an embodiment, the client method is operable in a web browser.

Viewed from a fourth aspect, an embodiment of the present invention provides server method operable for use with a data processing system, wherein the data processing system comprises a client and a server, the method comprising the steps of: receiving a message on a channel from a client, the message comprising a first plurality of attributes; in response to receiving the message, decoding the message to provide a request, wherein the request comprises the first plurality of attributes; and in response to providing the request for fetching a response, sending the request to a resource.

In an embodiment, the method further comprises the steps of: receiving a response from the resource, wherein the response comprises a second plurality of attributes; in response to receiving the response, encoding the response to provide a reply, wherein the reply comprises the second plurality of attributes; and in response to providing a reply, sending the reply on the channel.

Viewed from a fifth aspect, an embodiment of the present invention provides a computer program product comprising a non-transitory computer readable medium having a plurality of instructions stored on it. When executed by a processor, the instructions cause the processor to perform operations comprising receiving a call from a client application to a first method of a first object, wherein the first method comprises a first request to a server, and wherein the first request comprises a first plurality of attributes; in response to receiving the call, wrapping the object to provide a wrapped call to a second method of the wrapped object, wherein the second method comprises a second request to the server; in response to wrapping the object, converting the wrapped call into a message, wherein the message comprises the first plurality of attributes; in response to converting the request, establishing a channel to the server; and in response to establishing the channel, sending the message on the channel.

In an embodiment, the computer program product further comprises instructions for receiving a reply on the channel, wherein the reply comprises a second plurality of attributes; in response to receiving the reply, decoding the reply to provide a response, wherein the response comprises the second plurality of attributes; in response to decoding the reply, invoking a response handler; and in response to the response handler being invoked, sending the response to the client application.

Viewed from a sixth aspect, an embodiment of the present invention provides a computer program product comprising a non-transitory computer readable medium having a plurality of instructions stored on it. When executed by a processor, the instructions cause to processor to perform operations comprising: receiving a message on a channel from a client, the message comprising a first plurality of attributes; in response to receiving the message, decoding the message to provide a request, wherein the request comprises the first plurality of attributes; and in response to providing the request for fetching a response, sending the request to a resource.

In an embodiment, the computer program product further includes instructions for receiving a response from the resource, wherein the response comprises a second plurality of attributes; in response to receiving the response, encoding the response to provide a reply, wherein the reply comprises the second plurality of attributes; and in response to providing a reply, sending the reply on the channel.

BRIEF DESCRIPTION OF THE DRAWINGS

Embodiments of the present invention will now be described, by way of example only, with reference to example embodiments, as illustrated in the following figures.

DETAILED DESCRIPTION OF THE INVENTION

Figure 1:
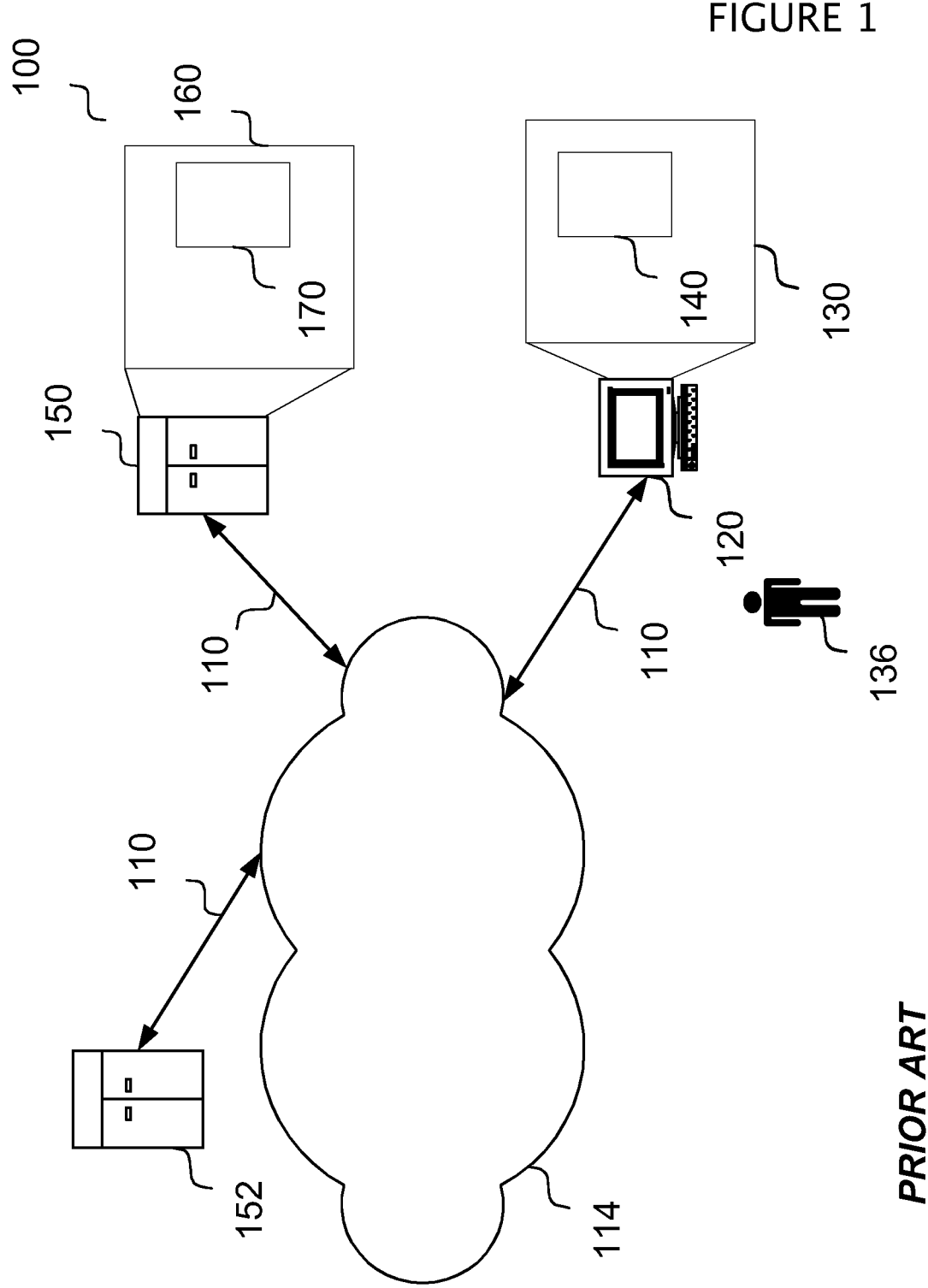
FIG. 1 is a block diagram depicting a data processing system in which an embodiment of the present invention may be implemented.

FIG. 1 is a block diagram depicting a data processing system 100 in which an embodiment of the present in Veil don may be implemented. An example of a data processing system 100 is the Internet. A web browser 130 may be operable by a user 136 on a data processing system 100 that comprises a workstation 120, and servers 150 and 152. The workstation 120, and the servers may be connectable through a network 114, which may comprise wired networks 110.

Typically, a name server 152 is also connectable to the network 114. A name server 152 translates a uniform resource locator (URL) into an Internet Protocol (IP) address. The user 136 accesses the Internet by interacting with the web browser 130 operable on a workstation 120. A client-side web application 140 is also operable on the workstation 120 in communication with a server-side application 170 operable on the server 150. The client-side web application 140 may be visible to the user 136 through the web browser 130. The client-side web application 140 also interacts with the web browser 130. The web browser 130 communicates with a web server 160 operable on the server 150. The web server 160 interacts with the server-side web application 170. Therefore, the client-side web application 140 interacts with the server-side web application 170.

Figure 2:
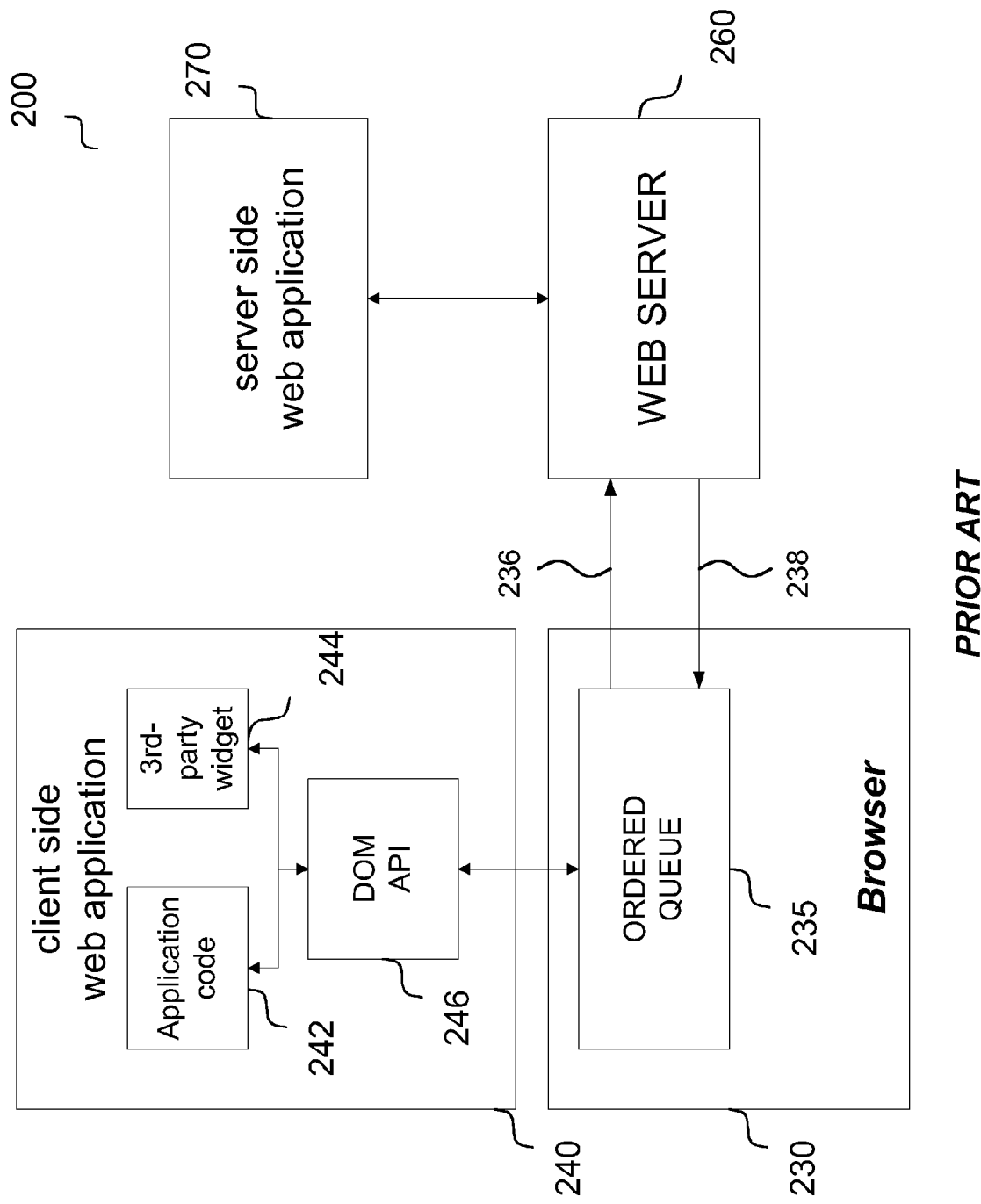
FIG. 2 is a block diagram depicting a web application.

FIG. 2 is a block diagram 200 depicting a web application. A client side web application 140, 240 comprises application code 242, and 3rd party widget code 244. A widget 244 may include a graphical user interface element that provides an interaction point for a user 136.

The application code 242 and the 3rd party widget code 244 may comprise JavaScript (JS) code. To interact with the server-side web application 170, 270, the code 242, 244 may use the Document Object Model (DOM) application programming interface (API) 246 with a method call to an XmlHttpRequest (XHR) object (for example a "send( )", or an "open( )" method) to send requests to a web server 160, 260. A call from the code 242, 244 to send( ) may be an order to send a request 236 to the web server 160, 260, there are more than a certain number of requests 236 currently handled by the web browser 130, 230, the web browser 130, 230 may place a new request 236 in an ordered queue 235. The web browser 130, 230 may send the request 236 when a response 238 for an earlier request 236 is received back from the web server 160, 260. The limitations of the ordered queue 235 may create bottlenecks and performance problems. The order on the queue 235 may be based on a first served basis. Web applications 140, 240 may not have any control over the queue 235, and also may not receive any information concerning the contents of the queue 235. When a response 238 is received it may be passed back to the calling code 242, 244, via the XMLHttpRequest object originally used to send the request.

The transaction between the browser 130, 230 and the web server 160, 260 may be managed by the XHR object. The XHR object may be the native object, provided by the web browser 130, 260 that may be used to send asynchronous JavaScript and XML (Ajax) requests in JavaScript to the server.

Figure 3:
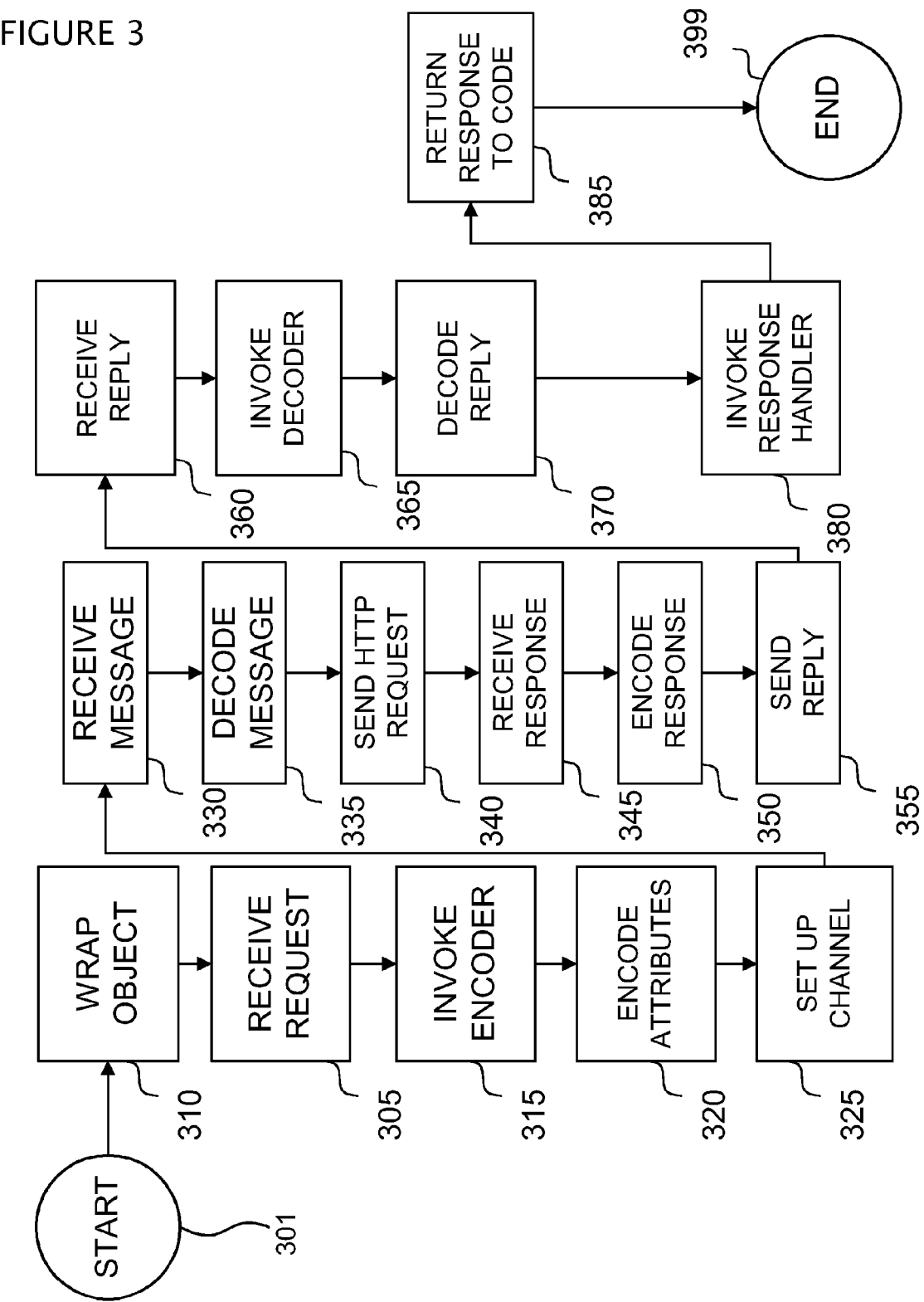
FIG. 3 is a high-level example schematic flow diagram depicting operation method steps of a client apparatus performed for interacting with a server apparatus of a server side web application, in accordance with an embodiment of the present invention.
Figure 4:
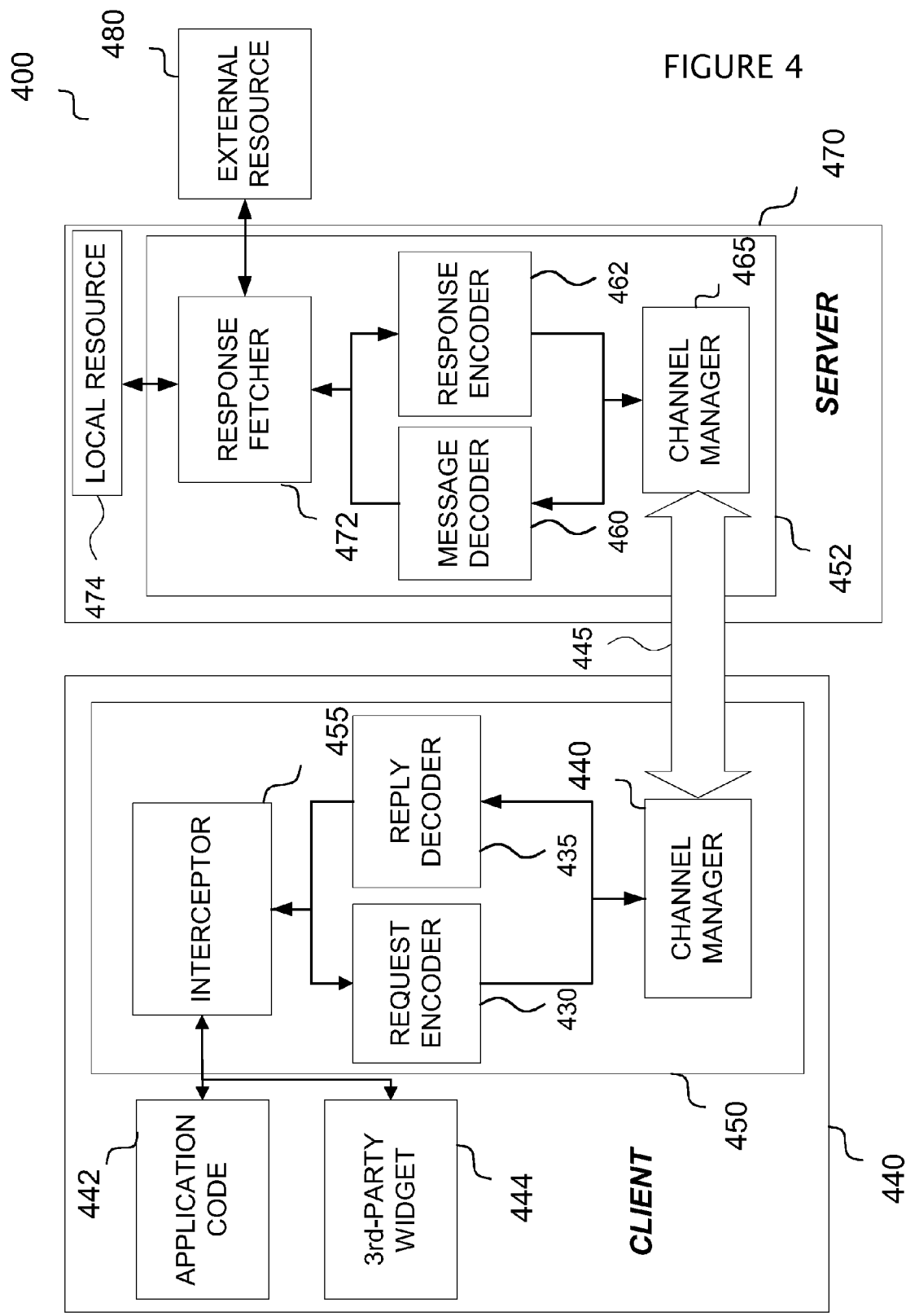
FIG. 4 is a block diagram depicting a client apparatus and a server apparatus, in which an embodiment of the present invention may be implemented.

FIG. 3, which should be read in conjunction with FIG. 4, is a high-level example schematic flow diagram 300 depicting operation method steps of a client apparatus 450 that may be performed for interacting with a server apparatus 452 of a server side web application 170, 170, in accordance with an example embodiment of the present invention. FIG. 4 depicts a block diagram 400 depicting a client apparatus 450 and a server apparatus 450, web applications 440, 470, in which an example embodiment of the present invention may be implemented.

FIG. 3 is set forth as a logical flow chart diagram. As such, the depicted order and labeled steps are indicative of one embodiment of the presented method. Other steps and methods may be conceived that are equivalent in function, logic, or effect of one or more steps or portions thereof, of the illustrated method. Additionally the format and symbols employed are provided to explain the logical steps of the method and are understood not to Limit the scope of the method.

The method may begin at step 301. A client-side web application 140, 440 may include application code 442, and 3rd party widget code 444. At step 305, an interceptor component 455 of the client apparatus 450 may receive a call to an XHR object to send a request to a server side web application 170, 470 from the code 442, 444. The XHR object call may include attributes (for example a URL, headers, and content).

At step 305 an interceptor component 455 may create a wrapper around the native XHR object prior to a first call to the native XHR object by the code 442, 444. The wrapped XHR object may have the same methods as the native XHR object. Wrapping the native XHR object may allow the interceptor component 455 to intercept any calls to one of the native XHR object's methods. All methods of the native XHR object may be wrapped to record the request attributes set by the calling code 442, 444. The calling code 442, 444 may call the wrapped XHR object, as if the native XHR object is being called. When the code 442, 444 calls one of the methods of the native XHR object, the interceptor component 455 may intercept the call and may instead call one of the methods of the wrapped XHR object. The code 442, 444 may not have an awareness of the mechanism that the client apparatus 450 and server apparatus 452 use to re-mute the request.

At step 310, the interceptor component 455 of the client apparatus 450 may receive a call to the native XHR object to send a request to a server side web application 170, 470 from the code 442, 444. The XHR object call may include attributes (for example a URL, headers, and content).

At step 315, when the code 442, 444 calls one of the methods of the native XHR object, the interceptor component 455 may invoke a client request encoder component 430. The term "a request" may generally refer to a call to one of the methods of XHR to send an HTTP to a web server 160 and load a web server 160 response directly back into the calling application code.

At step 320 the client request encoder component 430 may encode the request attributes in a specific format enabling it to be sent over a permanent channel or semi-persistent channel 445. Encoding the request attributes may create a message in the specific format, so that the message may be sent over the channel 445. The message may include all of the attributes of the request.

At step 325, a client channel manager component 440 may set up a channel 445 to a server channel manager component 465 in a server. The channel 445 may be based on existing protocols such as Bayeux. Bayeux is a protocol for transporting asynchronous messages, mainly over HTTP, with low latency between a web server. An example of a Bayeux protocol implementation is CometD. The channel 445 may include a single connection over which information of multiple requests or responses are exchanged in a specific format. In an example embodiment, the channel may be created the first time a request is sent. For all the subsequent requests, the same channel may be reused. At step 330 the server channel manager component 465 may receive the message. At step 335, a server request decoder component 460 may decode the request attributes in the message that have been sent over the channel 445. At step 340, a response fetcher component 472 may send real HTTP requests to either a local resource 474 of the server side web application 470, or to an external source 480, based on the decoded attributes. At step 345, the response fetcher component 472 may receive a response back from the local resource 474, or the external resource 480. At step 345, the response encoder component 462 may encode the response attributes in a specific format into a reply. At step 355, the reply may be sent by the server channel manager component 465, over the channel 445 to the client channel manager component 440. A "resource" may refer to anything that can be fetched using an HTTP request. For example, a resource may be a static resource, or a call to a Representational State Transfer (REST) API.

At step 360, the client channel manager component 440 may receive the reply over the channel 445 and, at step 365, may invoke a reply decoder component 435. At step 370, a response decoder component 435 may decode the reply into a response. At step 380, the interceptor component 455 may invoke a response handler on the calling code 442, 444. The response handler may be located in the wrapped XHR object. The response handler may provide the response to the calling code 442, 444 in the same way that the native XHR object would have, such that the method may be transparent to the calling code 442, 444.

The client request encoder component 430 may set a unique message identification code (ID) for the message sent over the channel 445. The server apparatus 452 may keep track of the message ID and sets a correlation reply ID in the reply that matches the message request ID so that the client apparatus 450 may correlate which reply corresponds to which message sent over the channel 445.

The method may end at step 399. In an example embodiment, the interceptor component 455 may wrap the native XHR Object by dynamically overriding the properties/methods of this object on page load. The methods and apparatus may also be appropriate for scripting language (for example JS) libraries that abstract the way that the Ajax requests are sent, because the XHR, object may be used as a foundation to send asynchronous requests. Bayeux techniques focus on the concept of application specific data sent by the protocol between a browser and a server, whereas the methods and apparatus of an example embodiment of the present invention may relate to general asynchronous requests. Client-side code (for example, client applications, widgets 442, 444) may explicitly use the Bayeux protocols, whereas an embodiment of the present invention may describe a transparent way to channel the request of code 442, 444. However, the Bayeux protocol can be used for an implementation of the underlying structure of an embodiment of the present disclosure.

In an example embodiment, the client apparatus 450 may be implemented as JavaScript code in the client web application 440. In an alternative embodiment, the client apparatus 450 may be implemented as plug-in code to the web browser 130, 230. In an alternative embodiment, the client apparatus 450 may be implemented as a modification to the core source code of the web browser 130, 230.

In an alternative embodiment, an example method may be applied to the interception of other native objects that trigger client requests to a server Examples from JavaScript include: "script" to load a script file; "iframe" to load a page; "img" to load an image; and "link" to load a stylesheet from a remote server). It will be clear to one of ordinary skill in the art that, although JavaScript has been used to illustrate an example embodiment of the invention, the apparatus and methods apply also to other scripting languages for client-server interactions. It will be clear to one of ordinary skill in the art that all or part of the method of the example embodiments of the present invention may suitably and usefully be embodied in a logic apparatus, or a plurality of logic apparatus, comprising logic elements arranged to perform the steps of the method and that such logic elements may comprise hardware components, firmware components or a combination thereof.

In some embodiments, the present invention may provide improvements to the performances of web applications including third-party extensions/widgets that embed their own client-side logic such as widgets.

In some embodiments, the present invention may allow for re-routing in a transparent manner to callers, all, and/or a portion of, asynchronous requests made by different components/widgets on a page through a managed channel that may be maintained by a web application between a client and a server. In some embodiments, the present disclosure may relate to client-side and server-side mechanisms to create, maintain and manage and use such channel between the client and the server in order to route the asynchronous requests in a transparent way. The channel may be either maintained permanently via a "Comet" connection or virtually via a series of sequential controlled Ajax requests.

In some embodiments, a mechanism for re-routing asynchronous requests may be hidden to any component making an asynchronous request, so that the same results may be delivered as if native JavaScript Objects are used for sending the Ajax requests. Therefore, in some embodiments, no changes may be necessary to the web application code, or to any third party widgets that are incorporated in it. A web application may bypass the web browser queue and immediately send requests to a web server through a permanent channel.

Advantageously, a mechanism for re-routing asynchronous requests may be applicable to any client application containing 3rd party scripting code (for example, JavaScript code), not only to "graphical" widgets. For example, a widget collecting metrics and sending the data to a remote server.

In some embodiments, the invention may be generalizable to any application containing a web component able to execute logic via scripting code to trigger asynchronous requests.

It will be appreciated that the method and arrangement described above may also suitably be performed fully or partially in software running on one or more processors (not depicted in the Figures), and that the software may be provided in the form of one or more computer program elements and/or computer readable instructions carried on any suitable data-carrier (e.g., a non-transitory computer readable medium; also not depicted in the Figures) such as a solid state, a magnetic or optical storage device or the like. For the avoidance of doubt, the term "comprising", as used herein throughout the description and claims is not to be construed as meaning "consisting only of." Also for the avoidance of doubt, copying one location to another, as used herein throughout the description and claims, is to be construed as meaning copy the data contents of one location to the other location.

The invention claimed is:

1. A client method configured for use with a data processing system, wherein the data processing system comprises a client and a server connectable through a network, the method comprising:
   receiving a call from a client web application to a first method of a first native XmlHttpRequest (XHR) object, wherein the first method comprises a first Asynchronous JavaScript +Extensible Markup Language (Ajax) request to the server, and wherein the first Ajax request comprises a first plurality of attributes;
   wrapping the first native XHR object to provide a wrapped call to a second method of the wrapped XHR object, wherein the second method comprises a second Ajax request to the server;
   converting the wrapped call into a message, wherein the message comprises the first plurality of attributes;
   establishing a channel to the server configured to transport a plurality of asynchronous messages;
   intercepting the received call from the client web application to the first method of the first native XHR object;
   calling the wrapped call to the second method of the wrapped XHR object instead of calling the first method of the first native XHR object, wherein the second method is different from the first method;
   setting a unique message identification code for the message;
   sending the message on the channel; and
   correlating a reply unique message identification code set by the server to a reply corresponding to the unique message identification code for the message to identify which reply corresponds to which message of the plurality of messages sent over the channel.

2. The client method of claim 1, wherein the client method further comprises:
   receiving the reply on the channel, wherein the reply comprises a second plurality of attributes;
   in response to receiving the reply, decoding the reply to provide a response, wherein the response comprises the second plurality of attributes;
   in response to decoding the reply, invoking a response handler; and
   in response to the response handler being invoked, sending the response to the client web application.

3. The client method of claim 1, wherein the client method is operable in the client web application.

4. The client method of claim 1, wherein the client method is operable in a web browser of the client.

5. A method configured for use with a data processing system, wherein the data processing system comprises a client and a server, the method comprising:
receiving a call from a client web application to a first method of a native XmlHttpRequest (XHR) object, wherein the first method comprises a first Asynchronous JavaScript +Extensible Markup Language (Ajax) request to the server, and wherein the first Ajax request comprises a first plurality of attributes;
wrapping the native XHR object to provide a wrapped call to a second method of the wrapped XHR object, wherein the second method comprises a second Ajax request to the server;
converting the wrapped call into a message, wherein the message comprises the first plurality of attributes;
intercepting the received call from the client web application to the first method of the native XHR object;
calling the wrapped call to the second method of the wrapped XHR object instead of calling the first method of the native XHR object, wherein the second method is different from the first method;
setting a unique message identification code for the message;
sending the message on a channel configured to transport a plurality of asynchronous messages over a network from the client to the server;
receiving the message on the channel from the client;
decoding the received message to provide a request, wherein the request comprises the first plurality of attributes;
in response to providing the request for fetching a response, sending the request to a resource; and
setting a reply unique message identification code to a reply corresponding to the unique message identification code of the message to correlate which reply corresponds to which message of the plurality of asynchronous messages transported on the channel.

6. The method of claim 5, wherein the method further comprises:
the server receiving a response from the resource, wherein the response comprises a second plurality of attributes;
in response to receiving the response, the server encoding the response to provide the reply to the client, wherein the reply comprises the second plurality of attributes; and
in response to providing the reply, the server sending the reply on the channel.

7. A client apparatus configured for use with a data processing system, wherein the data processing system comprises the client apparatus and a server connectable through a network, the client apparatus comprising:
at least one processor; and
at least one memory coupled with the at least one processor, the at least one memory comprising instructions, executable by the at least one processor, configured for:
receiving a call from a client web application to a first method of a native XmlHttpRequest (XHR) object, wherein the first method comprises a first Asynchronous JavaScript +Extensible Markup Language (Ajax) request to the server, and wherein the first Ajax request comprises a first plurality of attributes;
wrapping the native XHR object to provide a wrapped call to a second method of the wrapped XHR object, wherein the second method comprises a second Ajax request to the server;
converting the wrapped call into a message, wherein the message comprises the first plurality of attributes;
establishing a channel to the server configured to transport a plurality of asynchronous messages;
intercepting the received call from the client web application to the first method of the native XHR object;
calling the wrapped call to the second method of the wrapped XHR object instead of calling the first method of the native XHR object, wherein the second method is different from the first method;
setting a unique message identification code for the message;
sending the message on the channel; and
correlating a reply unique message identification code set by the server to a reply corresponding to the unique message identification code for the message to identify which reply corresponds to which message of the plurality of messages sent over the channel.

8. The client apparatus of claim 1, wherein the at least one processor is further configured for:
receiving the reply on the channel, wherein the reply comprises a second plurality of attributes;
responsive to receiving the reply, decoding the reply to provide a response, wherein the response comprises the second plurality of attributes;
responsive to decoding the reply, invoking a response handler; and
responsive to the response handler being invoked, sending the response to the client web application.

9. The client apparatus of claim 1, wherein the client web application is operable in the client apparatus.

10. The client apparatus of claim 1, further comprising a web browser operable in the client apparatus.

11. A data processing system comprising:
a client configured for:
receiving a call from a client web application to a first method of a native XmlHttpRequest (XHR) object, wherein the first method comprises a first Asynchronous JavaScript +Extensible Markup Language (Ajax) request to a server, and wherein the first Ajax request comprises a first plurality of attributes;
wrapping the native XHR object to provide a wrapped call to a second method of the wrapped XHR object, wherein the second method comprises a second Ajax request to the server;
converting the wrapped call into a message, wherein the message comprises the first plurality of attributes;
intercepting the received call from the client web application to the first method of the native XHR object;
calling the wrapped call to the second method of the wrapped XHR object instead of calling the first method of the native XHR object, wherein the second method is different from the first method;
setting a unique message identification code for the message;
sending the message on a channel configured to transport a plurality of asynchronous messages over a network to the server; and
a server apparatus comprising at least one processor and at least one memory coupled with the at least one processor, the at least one memory comprising instructions, executable by the at least one processor, configured for:
receiving the message on the channel from the client;

decoding the received message to provide a request, wherein the request comprises the first plurality of attributes;

responsive to providing the request for fetching a response, sending the request to a resource; and setting a reply unique message identification code to a reply corresponding to the unique message identification code of the message to correlate which reply corresponds to which message of the plurality of asynchronous messages transported on the channel.

12. The data processing system of claim 11, wherein the server apparatus is further configured for:

receiving a response from the resource, wherein the response comprises a second plurality of attributes;

responsive to receiving the response, encoding the response to provide the reply to the client, wherein the reply comprises the second plurality of attributes; and responsive to providing the reply, sending the reply on the channel.

13. A computer program product comprising a non-transitory computer readable medium having a plurality of instructions stored therein, which, when executed by a processor, cause the processor to perform operations comprising:

receiving a call from a client web application to a first method of a first native XmlHttpRequest (XHR) object, wherein the first method comprises a first Asynchronous JavaScript +Extensible Markup Language (Ajax) request to a server, and wherein the first Ajax request comprises a first plurality of attributes;

wrapping the first native XHR object to provide a wrapped call to a second method of the wrapped XHR object, wherein the second method comprises a second Ajax request to the server;

converting the wrapped call into a message, wherein the message comprises the first plurality of attributes;

establishing a channel to the server configured to transport a plurality of asynchronous messages;

intercepting the received call from the client web application to the first method of the first native XHR object;

calling the wrapped call to the second method of the wrapped XHR object instead of calling the first method of the first native XHR object, wherein the second method is different from the first method;

setting a unique message identification code for the message;

sending the message on the channel; and correlating a reply unique message identification code set by the server to a reply corresponding to the unique message identification code for the message to identify which reply corresponds to which message of the plurality of messages sent over the channel.

14. The computer program product of claim 13, further including instructions for:

receiving the reply on the channel, wherein the reply comprises a second plurality of attributes;

in response to receiving the reply, decoding the reply to provide a response, wherein the response comprises the second plurality of attributes;

in response to decoding the reply, invoking a response handler; and in response to the response handler being invoked, sending the response to the client web application.

15. A computer program product comprising a non-transitory computer readable medium having a plurality of instructions stored therein, which, when executed by at least one processor, cause the at least one processor to perform operations comprising:

receiving a call from a client web application to a first method of a native XmlHttpRequest (XHR) object, wherein the first method comprises a first Asynchronous JavaScript +Extensible Markup Language (Ajax) request to a server, and wherein the first Ajax request comprises a first plurality of attributes;

wrapping the native XHR object to provide a wrapped call to a second method of the wrapped XHR object, wherein the second method comprises a second Ajax request to the server;

converting the wrapped call into a message, wherein the message comprises the first plurality of attributes;

intercepting the received call from the client web application to the first method of the native XHR object;

calling the wrapped call to the second method of the wrapped XHR object instead of calling the first method of the native XHR object, wherein the second method is different from the first method;

setting a unique message identification code for the message;

sending the message on a channel configured to transport a plurality of asynchronous messages over a network from a client to the server;

receiving the message on the channel from the client decoding the received message to provide a request, wherein the request comprises the first plurality of attributes;

in response to providing the request for fetching a response, sending the request to a resource; and setting a reply unique message identification code to a reply corresponding to the unique message identification code of the message to correlate which reply corresponds to which message of the plurality of asynchronous messages transported on the channel.

16. The computer program product of claim 15, further including instructions for:

the server receiving a response from the resource, wherein the response comprises a second plurality of attributes;

in response to receiving the response, the server encoding the response to provide the reply to the client, wherein the reply comprises the second plurality of attributes; and in response to providing the reply, the server sending the reply on the channel.

* * * * *